// United States

Braunhut

[11] 3,867,020
[45] Feb. 18, 1975

[54] CONTROLLED LIGHT LIMITING LENS ASSEMBLY

[76] Inventor: Harold N. Braunhut, c/o Honey Toy Industries, Inc., 200 Fifth Ave., New York, N.Y. 10010

[22] Filed: Dec. 17, 1973

[21] Appl. No.: 425,313

[52] U.S. Cl.......................... 351/45, 2/14 B, 2/14 J, 350/205, 351/49
[51] Int. Cl......... G02c 7/16, G02c 7/12, A61f 9/04
[58] Field of Search ................. 351/49, 45; 350/205; 2/14 B, 14 J

[56] References Cited
UNITED STATES PATENTS
2,773,422 12/1956 Flynn, Sr. et al. ..................... 352/49
3,791,722 2/1974 Ahlberg et al. ....................... 351/45

Primary Examiner—Paul A. Sacher
Attorney, Agent, or Firm—Friedman & Goodman

[57] ABSTRACT

A controlled light-limiting lens assembly useful as a fishing aid includes a first lens member in the form of a sheet of louvered material provided with a central aperture which defines a limited angle of light acceptance disposed along a line of sight. The louvered material prevents the passage of light having an angle of incidence relative to the louvered lens material greater than the angle of light acceptance. A second lens member is provided which is made of a polarized material and disposed juxtaposed in a plane substantially parallel to that defined by the first lens member along the line of sight. The central aperture in the first lens member and the second lens member are aligned along the line of sight and the second lens member is rotatably mounted relative to the first lens member. In this manner, the light transmitted through the lens assembly is further limited by selection of a single angle of polarization of light incident within the predetermined angle of light acceptance. A pair of eyeglasses is described which incorporates the above described light limiting lens assemblies in each of the frame member portions adapted to be placed in front of a viewer's eyes.

16 Claims, 9 Drawing Figures

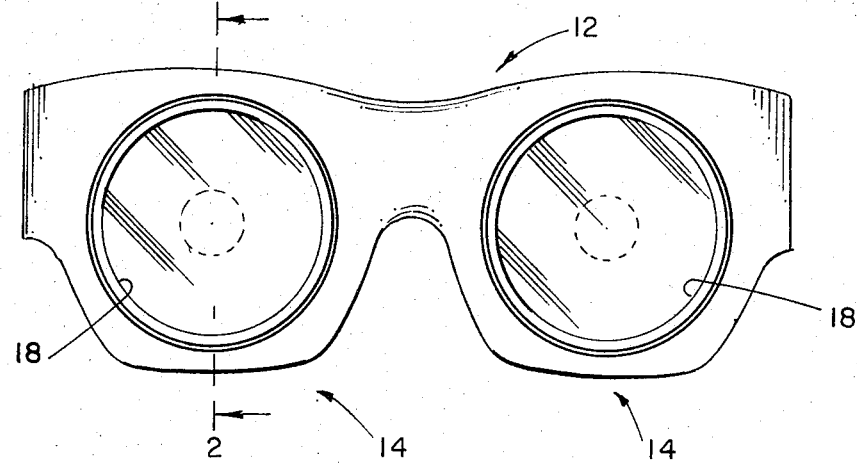
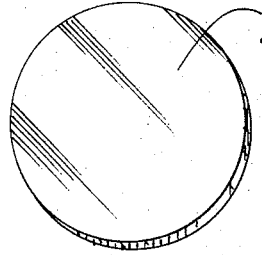
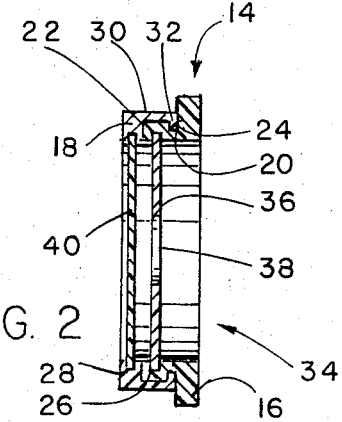
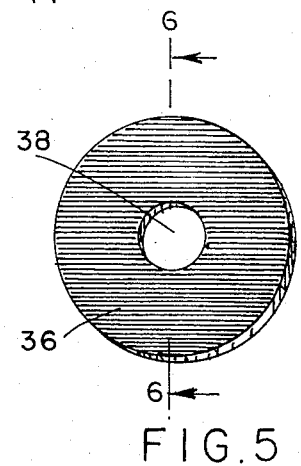
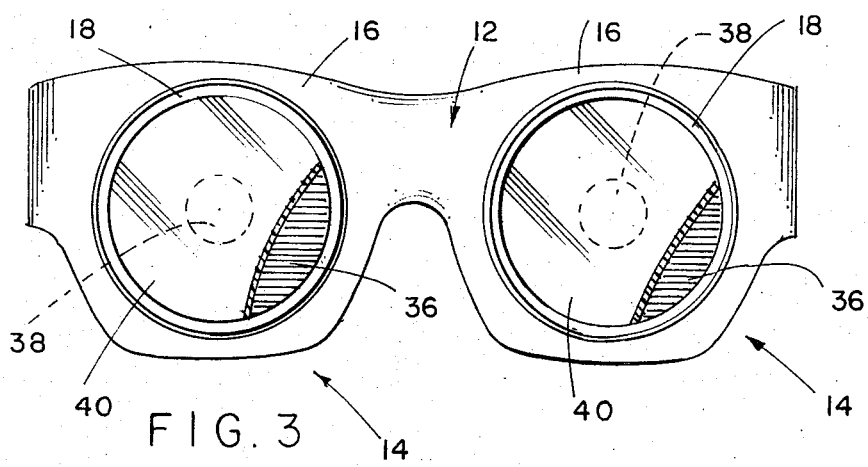

CONTROLLED LIGHT LIMITING LENS ASSEMBLY

BACKGROUND OF THE INVENTION

The present invention generally relates to eyeglasses or spectacles, and in particular to eyeglasses which include controlled light-limiting lens assemblies useful as fishing aids.

Eyeglasses with polarized elements are well known in the art. It is also known to utilize such eyeglasses for minimizing glare under particular conditions, such as viewing the surface of a body of water with sunlight incident thereon. When the sun's rays hit the body of water, particularly when the water is not perfectly calm but exhibits ripples or wavelets, the sunlight is reflected in many different directions so that glare is produced and it is very difficult or sometimes impossible to see through the water. It has been found that the effect of the glare can be greatly reduced or almost totally eliminated through the polarization of the reflected light through a polarized element. To this end, eyeglasses are known which include one or two polarized elements rotatably mounted directly in front of the eyes of the observer. By manipulating these polarized elements and changing their relative angles to the sunglass frames or to each other, the total amount of light reaching the observer's eyes can be controlled, when two polarized elements are used, or the angle of polarized light reaching the observer's eyes can be controlled when a single polarized element is used. However, the prior art constructions are generally flimsy and typically become damaged with extended use.

With respect to eyeglasses which are specifically intended to reduce or minimize glare while used as fishing aids to permit the viewing of fish and other forms of aquatic life below the surface of a body of water, where a single polarized element is utilized, these existing or known eyeglasses fail to limit the transmission of light to the observers eye from stray sources. These stray sources of light, such as the direct rays of the sun, constitute interferences which make more difficult the desired observations. Consequently, there are two requirements which are desirable in eyeglasses when the latter are to be used for careful observations in conditions where glare problems are well as sources of extraneous and interfering light exist. The first requirement is that a polarizing element be provided to limit the quality of the light transmitted to the observer's eyes to one angle of polarization. This is achieved by rotating the polarized element to a desired position to thereby permit the transmission of the desired angle of polarized light. However, the second requirement, which is not presently provided in known eyeglasses for this purpose, is that the angle of light acceptance be similarly limited to permit viewing of objects generally only along the axis of view of the observer's eyes while preventing sources of stray light outside the selected angle of acceptance from reaching the observer's eyes. This second requirement may be analogized to tunnel-type vision or placing blinders on the observer to prevent interfering light from reaching his eyes from a predetermined direction or directions. The provision of a polarized element is not in and of itself sufficient since the extraneous or interfering sources of light may similarly include components of polarized light which can pass through the polarized element and reach the observer's eyes.

SUMMARY OF THE INVENTION

Accordingly, it is an object of the present invention to provide a controlled light-limiting lens assembly which is not possessed of the disadvantages associated with prior art polarizing sunglasses and fishing aids.

It is another object of the present invention to provide a lens assembly which is simple in construction and economical to manufacture and whose resulting construction is sufficiently rugged to withstand extended usage.

It is still another object of the present invention to provide a lens assembly as above described which controls the amount of light transmitted therethrough to an observer's eyes by both controlling the angle of polarized light and direction of light which passes therethrough.

It is yet another object of the present invention to provide a lens assembly of the general type under discussion which permits the elimination of glare by the use of a polarizing element while preventing the transmission therethrough of extraneous or interfering sources of light outside of a predetermined angle of incidence.

It is a further object of the present invention to provide a lens assembly of the type above suggested which includes a lens member in the form of a sheet of louvered material which prevents the transmission of light having an angle of indicence greater than a predetermined angle of acceptance while permitting almost full transmission of light whose angle of incidence is within the predetermined angle of acceptance.

It is still a further object of the present invention to provide a control light-limiting lens assembly which minimizes the amojnt of stray or interfering light but which permits normal viewing of objects of interest.

It is yet a further object of the present invention to provide a pair of eyeglasses, useful as a fishing aid, which includes a pair of controlled light-limiting lens assemblies as described in the above objects.

In order to achieve the above objects, as well as others which will become apparent hereafter, the light-limiting lens assembly in accordance with the present invention comprises a first lens member in the form of a sheet of louvered material provided with a central aperture which defines a limited angle of light acdeptance disposed along a line of sight. Said louvered material prevents the passage of light having an angle of incidence greater than said angle of light acceptance relative to said first lens member. A second lens member made of a polarized material is provided and disposed juxtaposed in a plane substantially parallel to that defined by said first lens member along the line of sight. Said central aperture and said second lens member are aligned along the line of sight and said second lens member is rotatable relative to said first lens member. In this manner, the light transmitted through the lens assembly is further limited by selection of a single angle of polarization of light incident within said angle of light acceptance.

According to a presently preferred embodiment, the louvered material is made of a transparent sheet and an array of spaced opaque elements disposed within said sheet. Said opaque elements are advantageously disposed parallel to each other and generally parallel to the line of sight. With such a construction, said opaque elements only impair the transmission of light having an angle of incidence greater than a predetermined value relative to the plane of the sheet. Said opaque elements may be in the form of elongate parallel flat strips or may be in the form of a plurality of spaced concentric circular strips.

Any means may be provided for rotating said second lens member relative to said first lens member. For example, a frame member may be provided which supports the lens assembly. Said frame member may include an annular lens mount adapted to receive said first lens member, and an annular ring rotatably mounted on said lens mount and adapted to receive said second lens member. In this manner, said second lens member can be rotated relative to said second lens member by rotating said annular ring relative to said lens mount.

A presently preferred embodiment of a pair of eyeglasses in accordance with the present invention comprises a lens frame having two spaced frame member portions adapted to be placed in front of a wearer's eyes. Each frame member portion includes a fixed portion and a movable portion concentrically mounted on said fixed portion. Said movable portion is rotatable in a plane generally normal to the direction of sight. A first lens member of polarized material is mounted on said movable portion for common rotary movement with the latter for controlling the angle of polarization of light which passes therethrough. A second lens member is provided made of louvered material mounted on said fixed portion. Said louvered second lens member is provided with a central aperture and defines a limited angle of light acceptance. With such a construction, only appropriately polarized light within the angle of light acceptance is permitted to be transmitted to the observer. The eyeglasses prevent the passage of polarized light or extraneous light the angle of incidence of which in greater than said angle of light acceptance.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a front elevational view of a pair of eyeglasses in accordance with the present invention which include two controlled light-limiting lens assemblies and which is suitable as a fishing aid;

FIG. 2 is a cross section, in a somewhat different scale, of the frame and one of the lens assemblies shown in FIG. 1, taken along line 2—2;

FIG. 3 is similar to FIG. 4, but showing the lens assemblies partially fragmented to show the louvered lens members which are disposed behind the polarized lens members or elements;

FIG. 4 is a perspective view of a polarized lens element or member which forms part of the lens assembly shown in FIG. 2;

FIG. 5 is a perspective view of a louvered lens element or member which forms part of the lens assembly shown in FIG. 2;

DESCRIPTION OF THE PREFERRED EMBODIMENTS

Figure 7:
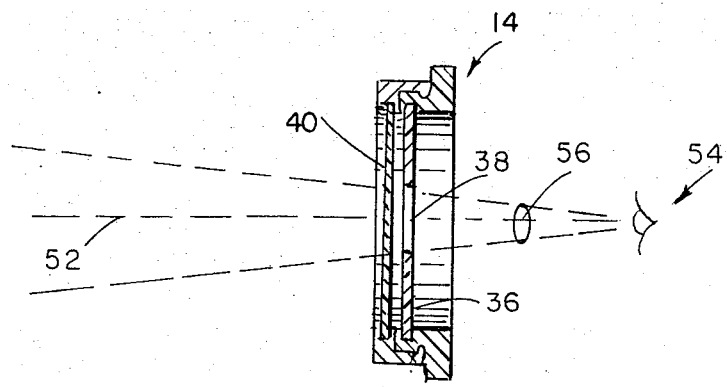
FIG. 7 is similar to FIG. 2 and showing how the louvered lens member of the lens assembly limits the angle of acceptance of light to prevent excessive passage of extraneous or interfering light through the eyeglasses to an observer's eye.

Referring now to the FIGURES, in which identical or similar parts are designated by the same reference numerals throughout, and first referring to FIGS. 1-5, a pair of eyeglasses or spectacles 10 are generally designated by the reference numeral 10. The eyeglasses 10 include a conventional lens frame 12, the temples of which are not shown.

The lens frame 12 generally includes two frame member portions 14 which are connected to each other by a bridge adapted to be supported on the nose of the wearer.

The presently preferred construction to be described is only illustrative and minor variations from this construction are contemplated to be included within the scope and spirit of the present invention. Each frame member portion 14 includes an annular lens mount 16 and an annular ring 18 which is rotatable relative to the annular lens mount. In the presently preferred embodiment, the annular lens mounts 16 and the annular rings 18 are coupled to each other and, more particularly, the annular rings 18 are rotatably mounted on the annular lens mounts 16 by suitable coupling or connecting means. The connecting means in the presently preferred embodiment each include an annular neck 20 which projects axially from each annular lens mount 16, the annular necks being provided with outwardly radial projections 22. Each outwardly radial projection 22 is spaced from the main portion of a respective annular lens mount 16 to form a radially inward annular recess, groove or channel 24. Each radial projection 22 is provided along its inner surface with a recessed seat 26 while each annular ring 18 is similarly provided with a recessed seat 28, for reasons to be described hereafter.

An axially projecting annular wall 30 extends from the main portion of each annular ring 18 and is provided at the free end thereof with an inwardly radial annular projection 32 dimensioned to be received within an annular groove 24. In this arrangement, the annular grooves 24 and the radial projections 32 are circular. Each annular projection 32 is disposed within a respective annular recess or groove 24 with some clearance to permit sliding movement of the former within the latter. In this manner, the annular ring 18 is maintained in a mounted condition on the annular lens mount 16 while being adapted to rotate relative to the latter.

An important feature of the present invention is to provide a lens assembly, generally designated by the reference numeral 34 in FIG. 2, which includes a first lens member 36 in the form of a sheet of louvered material provided with a central aperture 38 which is securely mounted within the recessed seat 26. A second lens member 40 made of a polarized material is disposed juxtaposed in a plane substantially parallel to that defined by the louvered sheet 36 or first lens member along the line of sight. The second lens member 40 or polarized element 40 is held within the recessed seat 28 and is disposed in front of the louvered sheet 36, as best shown in FIGS. 2 and 3. With this arrangement, all light reaching the eye of an observer, disposed behind the louvered sheet 36, must pass through the latter and though the polarized element 40. As to be more further described in connection with FIGS. 6–9, eyeglasses made in the manner above described permit controlled light limiting, particularly useful when utilized as a fishing aid.

Figure 6:
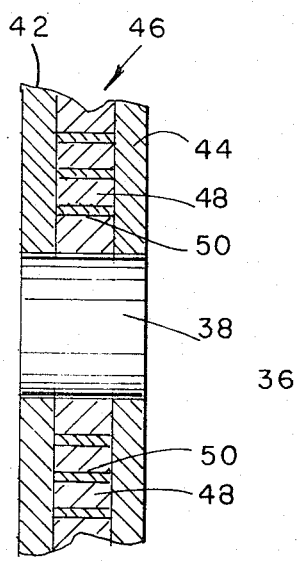
FIG. 6 is an enlarged and fragmented cross sectional view of the louvered lens element ahown in FIG. 5, taken along line 6—6.

In FIG. 6, the louvered lens member or sheet 36 is shown in greater detail. The louvered sheet 36 is typically a composite unit, commonly known as "light control film," manufactured by the 3M company. The composite sheet 36 is formed by spaced transparent sheets 42 and 44 with a louvered array 46 of transparent zones 48 and opaque zones 50. The array 46 generally includes a third transparent sheet or layer 48 sandwiched between the transparent sheets 42 and 44. The material generally commercially available is constituted generally of a plurality of longitudinally extending opaque elements which are commonly inclined relative to the two end transparent sheets at an angle of substantially 30°. Such composite sheets are generally formed, at least in part, of cellulose acetate butyrate, although polycarbonate or other suitable substances may be used likewise. The opaque zones or elements are generally provided by forming slits in the intermediate layer and, thereafter, filling these slits with an opaque pigment. The inherent nature of the intermediate sheet is to permit observation from one direction along one surface of the louvered arrangement, through the transparent zones 48, while preventing observation of objects from other directions. In the present application, the opaque elements 50 are disposed substantially transversely to the general extent of the transparent sheets 42, 44 and 48, the opaque elements 50, in combination, defining a limited angle of light acceptance.

The angular orientation of the opaque elements 50 relative to the planes defined by the transparent sheets 42 and 44 determines the angle of acceptance of light which can pass through each louvered sheet or lens member 36. More particularly, a limited angle of light acceptance is formed about a line of view which is generally parallel to the opaque elements 50. Accordingly, while the angle of acceptancee is centered around a line inclined relative to the transparent portions 42 and 44 in the instance where the opaque elements 50 are themselves inclined, the angle of acceptance for the material shown in FIG. 6 is centered around a line which is normal to these transparent sheets. The opaque elements 50 may be in the form of elongate parallel flat strips, in which case the predetermined angle of light acceptance is formed about a plane parallel to the strips. Clearly, such a louvered material permits light to enter or pass through the material when it comes from the sides, when the opaque elements are horizontally disposed, or from upper and lower directions, when the opaque elements 50 are vertically disposed. However, when the opaque elements are in the form of a plurality of spaced concentric circular strips, the limited angle of light acceptance is formed about a central axis about which the elements are disposed. The resulting angle of acceptance is in the form of a cone instead of a trianguilar wedge as with the flat opague elements. However, louvered materials which include parallel flat opaque elements 50 can be utilized to advantage when interfering light primarily originates in one or two opposing directions. In such an instance, as with sunlight, the louvered material or lens member 36 can be oriented to dispose the opaque elements 50 in directions generally normal to the rays of interfering light.

Referring to FIG. 7, the limited angle of light acceptance is illustrated. Here, a representation of a human eye 54 is shown disposed spaced behind the louvered lens member 36. The aperture or central opening 38 is disposed substantially in front of and along the line of view 52 of the eye. The central aperture 38 assures clear, unimpeded view of objects directly in front of the eye. The aperture 38 also defines a primary angle of light acceptance generally designated by the reference numeral 56. However, the angle of light acceptance 56 is slightly modified by the angle of light acceptance defined by the opaque elements 50 within the louvered lens 36. As described above, the angle of light acceptance defined by the opaque elements is centered around the line of view 52 when the opaque elements 50 are disposed substantially transverse to the planes of the transparent sheets 42, 44 and 48. Vision through the louvered lens 36 in a direction normal to the general extent thereof is substantially unimpeded since the sheets 42, 44 and 48 are transparent. However, incident light which has an angle of incidence greater than the angle of light acceptance as defined by the central aperture 38 and the opaque elements 50 is reflected and absorbed by the opaque elements without being permitted to be transmitted to the eye 54 of the observer. With reference to FIG. 7, as described above, when the opaque elements 50 are in the form of a plurality of spaced concentric circular strips, the field of light acceptance is in the shape of a cone having its axis along the line of view 52. However, when the opaque elements are in the form of elongate parallel flat strips which are horizontally disposed, for example, the field of view is increased in lateral directions or to the sides of the observer, as viewed in FIG. 7. On the other hand, if the opaque elements are vertically disposed, the field of view is enhanced in upward and downward directions as viewed in FIG. 7. In each case, a wedge-shape field of view would be formed symmetrically disposed about a plane passing through the line of view 52 and parallel to the orientation of the opaque elements 50.

Figure 8:
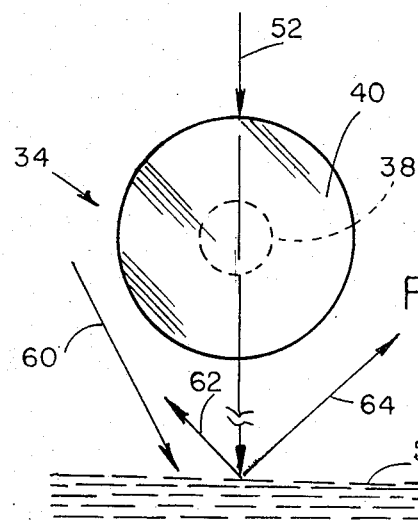
FIGS. 8 and 9 are diagramatic representations to illustrate the manner in which the lens assemblies of the present invention eliminate glare and permit the viewing of objects below a surface of a body of water.
Figure 9:
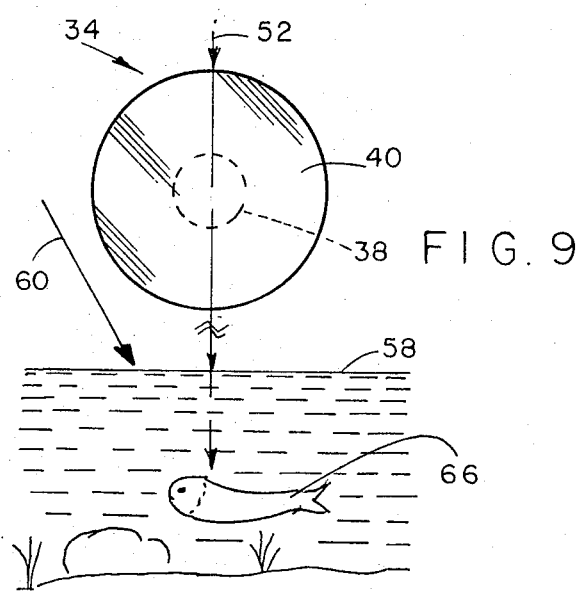

The lens assembly 34 can be used individually or two such assemblies can be mounted in frame member portions 14 of a pair of eyeglasses 10. In each case, the lens assembly permits controlled light limiting both as to incoming angle of incidence as well as angle of polarization. Such devices are particularly useful as fishing aids to permit viewing of objects below the surface of a body of water in the presence of glare and extraneous sources of interfering light. Referring to FIGS. 8 and 9, when incident light, as indicated by the arrows 60, strike the surface of a body of water 58, the light is reflected from the surface of the water, as indicated for example by arrows 62 and 64, in many directions. The degree of dispersion of the icident light is a function of the flatness of the body of water. Frequently, the presence of wavelets or surface disturbances result in random scattering of incident light in many directions. The light so reflected produces the glare that makes it very difficult if not impossible to see through the water. However, the effect of glare can be greatly reduced and practically eliminated through the use of polarized elements such as lens elements 40. This is achieved by filtering the light which impinges upon the polarized element 40 and only permitting the light having a predetermined polarization angle to pass therethrough. Clearly, as the polarized elements 40 are rotated, to components of the incident light having different angles of polarization are transmitted therethrough. It has been found that the position of the polarized elements 40 can be optimized to eliminate the glare producing elements of the incident light.

In FIG. 9, the light components having the various angles of polarization are shown to be eliminated by the polarizing element 40 with the result that the viewer looking along the line generally indicated by the arrows 52 can see through the body of water 58 and, for example, see a fish 66 or other marine life in the water. Consequently, the eyeglasses 10 are extremely helpful for observing fish and other marine life within a body of water. Such fish or marine life would normally not be visible as a result of the glare of the reflected light from the surface of the water. By appropriately selecting the nature and orientation of the opaque elements 50 in the louvered lens member 36, the viewer is additionally protected from extraneous and interfering sources of light, which may be of substantial intensity, to thereby prevent interference with the desired observations.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A light-limiting lens assembly comprising a first lens member in the form of a sheet of louvered material provided with a central aperture which defines a limited angle of light acceptance disposed along a line of sight, said louvered material preventing the passage of light having an angle of incidence greater than said angle of light acceptance relative to said first lens member; and a second lens member made of a polarized material and disposed juxtaposed in a plane substantially parallel to that defined by said first lens member along the line of sight, said central aperture and said second lens member being aligned along the line of sight, and said second lens member being rotatable relative to said first lens member, whereby the light transmitted through the lens assembly is further limited by selection of a single angle of polarization of light incident within said angle of light acceptance.

2. A light limiting assembly as defined in claim 1, wherein said louvered material is made of a transparent sheet; and an array of spaced opaque elements disposed within said sheet, said opaque elements being disposed parallel to each other and generally parallel to the line of sight, whereby said opaque elements only impair the transmission of light having an angle of incidence greater than a predetermined value relative to the plane of said sheet.

3. A light limiting assembly as defined in claim 2, wherein said opaque elements are in the form of elongate parallel flat strips.

4. A light limiting assembly as defined in claim 2, wherein said opaque elements are in the form of a plurality of spaced concentric circular strips.

5. A light limiting assembly as defined in claim 1, further comprising a frame member which supports the lens assembly, said frame member comprising an annular lens mount adapted to receive said first lens member, and an annular ring rotatably mounted on said lens mount and adapted to receive said second lens member, whereby said second lens member can be rotated relative to said second lens member by rotating said annular ring relative to said lens mount.

6. A light limiting assembly as defined in claim 5, wherein said lens mount and said annular ring are provided with annular recessed seats adapted to receive said respective lens members.

7. A light limiting assembly as defined in claim 1, further comprising a frame member which supports the lens assembly, said frame member comprising an annular lens mount adapted to receive said first lens member, an annular ring adapted to receive said second lens member, and coupling means for rotatably mounting said annular ring on said lens mount, whereby said coupling means permits said second lens member to rotate relative to said first lens member by rotation of said annular ring relative to said lens mount.

8. A light-limiting lens assembly as defined in claim 7, wherein said coupling means comprises a circular annular projection on one of said lens mount and annular ring, and a circular annular on the other of said lens mount and annular ring, said annular projection being disposed within said annular recess with some clearance to permit sliding movement of the former within the latter.

9. A pair of eyeglasses comprising a lens frame having two spaced frame member portions adapted to be placed in front of a wearer's eyes, each frame member portion including a fixed portion and a movable portion concentrically mounted on said fixed portion, said movable portion being rotatable in a plane generally normal to the direction of sight; a first lens member of polarized material mounted on said movable portion for common rotary movement with the latter for controlling the angle of polarization of light which passes therethrough; and a second lens member of louvered material mounted on said fixed portion, said louvered second lens member being provided with a central aperture and defining a limited angle of light acceptance, whereby only appropriately polarized light within said angle of light acceptance is permitted to be transmitted to the observer, the eyeglasses preventing the passage of polarized light or extraneous light the angle of incidence of which is greater than said angle of light acceptance.

10. A pair of eyeglasses as defined in claim 9, wherein said louvered material is made of a transparent sheet; and an array of spaced opaque elements disposed within said sheet, said opaque elements being disposed parallel to each other and generally parallel to the line of sight, whereby said opaque elements only impair the transmission of light having an angle of incidence greater than a predetermined value relative to the plane of said sheet.

11. A pair of eyeglasses as defined in claim 10, wherein said opaque elements are in the form of elongate parallel flat strips.

12. A pair of eyeglasses as defined in claim 10, wherein said opaque elements are in the form of a plurality of spaced concentric circular strips.

13. A pair of eyeglasses as defined in claim 9, wherein said fixed portions are annular lens mounts adapted to receive said first lens member, and said movable portions are annular rings rotably mounted on said lens mounts and adapted to receive said second lens members, whereby said second lens members can be rotated relative to said second lens members by rotating said annular rings relative to said lens mounts.

14. A pair of eyeglasses as defined in claim 13, wherein said lens mount and said annular ring are provided with annular recessed seats adapted to receive said respective lens members.

15. A pair of eyeglasses as defined in claim 9, wherein said fixed portions are annular lens mounts adapted to receive said first lens members, said movable portions are annular rings adapted to receive said second lens members, and coupling means for rotatably mounting said annular rings on respective ones of said lens mounts, whereby said coupling means permits said second lens member to rotate relative to said first lens member by rotation of said annular ring relative to said lens mount.

16. A pair of eyeglasses as defined in claim 15, wherein said coupling means comprises a circular annular projection on one of said lens mount and annular ring, and a circular annular recess on the other of said lens mount and annular ring, said annular projection being disposed within said annular recess with some clearance to permit sliding movement of the former within the latter.

* * * * *